United States Patent [19]

Box, Jr. et al.

[11] 3,997,440
[45] Dec. 14, 1976

[54] POLLUTED WATER PURIFICATION

[75] Inventors: E. O. Box, Jr.; Floyd Farha, Jr., both of Bartlesville, Okla.

[73] Assignee: Phillips Petroleum Company, Bartlesville, Okla.

[22] Filed: Apr. 1, 1976

[21] Appl. No.: 672,826

[52] U.S. Cl. .............................. 210/63 R; 252/462; 252/471; 252/475; 252/476
[51] Int. Cl.$^2$ ..................... B01J 11/22; C02B 1/34
[58] Field of Search ......... 210/63 R; 252/462, 471, 252/475, 476; 423/599

[56] References Cited

UNITED STATES PATENTS

| | | | |
|---|---|---|---|
| 2,699,425 | 7/1934 | Moses et al. | 210/63 R |
| 3,365,337 | 1/1968 | Hoffman | 252/471 |
| 3,823,088 | 7/1974 | Box et al. | 210/63 R |
| 3,839,545 | 10/1974 | Schwab et al. | 252/471 |
| 3,865,923 | 2/1975 | Stephans | 252/471 |
| 3,907,716 | 9/1975 | Haacke | 252/471 |

*Primary Examiner*—Thomas G. Wyse

[57] ABSTRACT

Organically polluted waters are purified by contacting with a solid copper-manganese-oxygen catalyst promoted with at least one Group II metal under oxidizing conditions. In one preferred embodiment, an aqueous stream obtained from the effluent of an oxidative dehydrogenation process containing contaminating oxygen-containing organic materials is subjected to oxidizing conditions in the presence of a copper manganite catalyst promoted with at least one Group II metal to convert the water to an aqueous product.

12 Claims, No Drawings

POLLUTED WATER PURIFICATION

This invention relates to the purification of organically polluted waters. In accordance with another aspect, this invention relates to a process for converting organic contaminated aqueous streams to fresh water by oxidation in the presence of a Group II metal-promoted solid copper-manganese-oxygen catalyst. In accordance with another aspect, this invention relates to a continuous process for the abatement of water pollution by removing oxidizable organic wastes from aqueous streams by oxidizing these compounds preferably in the liquid phase in the presence of a solid copper manganite catalyst promoted with at least one of Group IIA and Group IIB metals and metal compounds. In accordance with a further aspect, this invention relates to an improved copper manganite catalyst promoted with at least one Group II metal and, optionally, with a second promoter metal, which catalyst has utility in oxidation reactions.

The problem of disposing of waste-containing waters has, in recent years, become more acute due to increasing population and increasing industrial activity. This is particularly true of waters which are polluted by the presence of organic materials such as waters discharged in a chemical process. Frequently, such waste waters contain organic materials in concentrations far too low for them to be conveniently or economically recoverable, yet in concentrations so high that it is impractical and undesirable to simply pump the waste water into available streams, rivers, lakes, or ponds.

Some processes are known in which such organic-containing waste waters can be subjected to air oxidation under elevated temperatures. Such air oxidation converts most or all of the organic matter into harmless materials such as carbon dioxide or water vapor. This reaction is sometimes carried out in the presence of catalysts to promote the oxidation and to allow the reaction to be carried out under less severe conditions.

Although a number of catalysts and catalytic processes are known to carry out such air oxidation, not all catalysts which have activity for promoting oxidation have been found to be suitable. The conditions under which small amounts of organic wastes are oxidized in the presence of large amounts of water are relatively severe. The present invention provides an alternative catalyst and process to achieve this purpose. The outstanding feature of the invention is the activity and durability of the catalyst system.

Accordingly, an object of this invention is to provide an improved process for the purification or organically polluted water.

Another object of this invention is to provide a process for the purification of water streams containing oxygen-containing compounds.

A further object of this invention is to provide an improved oxidation catalyst.

Other objects and aspects, as well as the several advantages of the invention, will be apparent to those skilled in the art upon reading the specification and the appended claims.

In accordance with the invention, a process is provided for converting water contaminated with organic materials to an aqueous product by contacting contaminated aqueous streams under oxidation conditions with a Group II metal-promoted solid copper-manganese-oxygen catalyst (copper manganite).

More specifically, in accordance with the invention, a process is provided for continuously converting organic contaminated aqueous streams to fresh water by contacting such an aqueous stream in the liquid or vapor phase with a solid copper manganite catalyst promoted with at least one Group II metal or metal compound under conditions to produce water essentially free of pollutants.

Further, in accordance with the invention, an improved catalyst useful for oxidation reactions is provided by promoting a solid copper manganite catalyst with at least one metal or metal compound of Groups IIA and IIB metals.

In accordance with another embodiment, an improved copper manganite catalyst consisting essentially of copper, manganese, and oxygen is provided by promoting copper manganite with at least one of Group IIA and Group IIB metals and metal compounds thereof plus at least one of bismuth and thallium and compounds thereof as additional metal promoters.

The pollutants, for example, are dissolved and suspended olefins, paraffins, aromatics, naphthenes, and oxygenated organic compounds including acids, alcohols, aldehydes, ethers, ketones, and the like contained in waste water produced from various chemical and biological sources.

The solid copper manganite catalyst compositions utilized in this invention consist of copper, manganese, and oxygen in which the atomic ratio of copper to manganese can vary from about 0.25:1 to about 4:1. Particularly useful compositions have empirical formulas such as $Cu_3Mn_2O_6$, $Cu_2Mn_2O_5$, $CuMn_2O_3$, $CuMnO_2$, $CuMn_3O_4$, and $CuMn_2O_4$, and mixtures thereof. These catalysts are prepared by employing conventional techniques including intimate mixing of the oxides or hydroxides by ball milling, grinding, and the like, and by coprecipitation of the oxalates or hydroxides from a solution containing dissolved salts of the metals. The precipitate is washed to remove soluble contaminants such as, for example, potassium nitrate, sodium chloride, sodium sulfate, and the like. The purified material is then dried and calcined in air for about 30 minutes to 20 hours or longer at temperatures ranging from about 500° to 1600° F (260°–871° C), more preferably from about 900°–1100° F (482°–593° C).

The catalysts contemplated in the practice of this invention comprise solid compositions of copper, manganese, and oxygen (copper manganite) promoted with a compound of an element selected from among Periodic Groups IIA and IIB. Particularly preferred elements are selected from the group consisting of calcium, strontium, barium, and zinc. In some instances, a bismuth compound or a thallium compound can also be included as a second promoter. Metal compounds that can be used in preparing the catalysts include the acetates, chlorides, hydroxides, oxides, nitrates, sulfates, and the like, and mixtures thereof. Exemplary compounds, for example, include copper acetate, copper nitrate, copper oxides, copper sulfate, manganese chloride, manganese nitrate, manganese oxides, calcium chloride, calcium formate, calcium hydroxide, barium acetate, barium nitrate, strontium chloride, strontium nitrate, zinc acetate, zinc nitrate, bismuth nitrate, bismuth trioxide, thallium acetate, thallium nitrate, and the like, and mixtures thereof.

The atom ratios of the metal components making up the catalysts generally are in the following ranges: Cu/Mn from about 0.25:1 to about 4:1 and promoter metal(s)/Mn from about 0.02:1 to about 4:1 and more preferably from about 0.04:1 to about 3:1.

The catalyst compositions of the invention are prepared conventionally by coprecipitation of the hydroxides, carbonates, or oxalates from a solution containing dissolved salts of the metals, by intimate mixing of oxides, carbonates, hydroxides, etc., by milling, grinding, and the like. Soluble contaminants such as sodium nitrate, potassium sulfate, and the like are removed by washing, after which the purified material is dried. The dried material can be calcined in air for about 30 minutes to 20 hours or longer at temperatures ranging from 500° F to 1600° F (260°–871° C), more preferably from about 800°–1100° F (426°–593° C). Following calcination, the product can be sized by sieving to obtain particles of the desired size or the product can be converted into wafers, pills, tablets, etc., by employing conventional pilling practices in which lubricants can be employed. When a lubricant is used, it is removed by a second calcination. Alternately, the dried material can be admixed with a minor amount (i.e., about 1–10 weight percent) of a conventional lubricant or processing aid such as polyethylene and formed into tablets, etc. The resulting material is then calcined as described before which removes the lubricant and prepares the product for use. If desired, the finished tablets can be crushed and sieved to obtain a selected particle size range such as, for example, 10 to 20 mesh particles.

As previously indicated, metal salts of copper, manganese, and promoter metals that can be used in forming the catalysts include the acetates, chlorides, formates, nitrates, sulfates, and the like. When dry mixing is employed to formulate the compositions, the oxides, carbonates, hydroxides, oxalates, and the like can be used, providing that upon calcination in air the final product has the desired previously cited composition. The calcined product is a catalyst of spinel structure having an ordered crystal structure encompassing all components and has an apparent bulk density of about 0.8 to about 1.7 g per cc and a surface area ranging from about 8–50 square meters per gram.

Aqueous wastes which are applicable as feeds for the process of the present invention are those which contain minor amounts of dissolved and/or suspended organic materials. The process is particularly applicable for feeds in which the organic materials are hydrocarbons and/or oxygenated hydrocarbons such as are obtained in the aqueous streams recovered from the effluent from an oxidative dehydrogenation process. The organic materials can be present in the predominantly aqueous stream in a broad range of concentrations, but will ordinarily be present in amounts less than about 10 weight percent. It is generally more convenient to characterize the aqueous feeds by the total carbon content. Consequently, such feeds can contain from about 10 to about 100,000 ppm carbon, more frequently 25 to about 10,000 ppm carbon, and still more frequently 100–5,000 ppm carbon.

Such aqueous waste streams can be derived from any source such as chemical or biological sources. For best results, the aqueous waste streams will contain relatively little nonvolatile and/or nonoxidizable inorganic materials.

The process can be carried out under a wide range of oxidation conditions depending upon the feedstock, catalyst, desired degree of removal of organic pollutant, and whether a liquid phase or vapor phase operation is used. Any suitable apparatus is used in a continuous or batch operation. Continuous operation through a fixed catalyst bed is presently preferred such as downflow operation through a vertically positioned fixed catalyst bed although other reaction modes can also be used.

In liquid phase operation, the temperature within the reaction zone generally will range from about 300°–575° F (149°–302° C), with a temperature in the range of about 400°–525° F (204°–274° C) being preferred, and under sufficient pressure to maintain a liquid phase in the reaction zone. Pressures up to 1100 psig (7584 kPa gage) or higher (i.e., 2000 psig or 13,790 kPa gage) can be employed for this purpose. The molar ratio of water to air in the reaction zone will be in the range of 5:1 to 200:1, preferably 8:1 to 50:1. The water feed will generally pass through the reaction zone at a rate of 0.1–10, preferably 2–5, LHSV.

In vapor phase operation, the temperature in the reaction zone will range from about 300°–1200° F (149°–649° C) at any convenient pressure. Generally, pressures ranging from about atmospheric to 100 psig (100–689 kPa gage) will be used. The molar ratio of water to air will be 10:1 to 200:1, preferably 80:1 to 150:1. The water rate will be in the range of 0.1–50, preferably 20–40, LHSV.

It can be seen from the above that in vapor phase operation which utilizes higher temperatures, much higher space rates can be utilized. Nevertheless, because vapor phase operation requires the vaporization of relatively large quantities of water, it is presently preferred to operate under liquid phase conditions.

The catalysts of this invention are active and relatively long-lived. When they become less active with the passage of time, they can be regenerated at process temperatures by shutting off the waste water feed and passing air through the catalyst bed.

SPECIFIC EXAMPLE

CATALYST PREPARATION

Appropriate quantities of the desired metal nitrates for catalysts 1–5, generally totaling about 1 to 1.5 moles salt per batch, were dissolved in distilled water to obtain about 1200 ml solution per batch. To each solution, while stirring, was added sufficient aqueous 12 weight percent potassium hydroxide solution to reach a final pH of 10.5 Each resulting slurry was filtered to recover the solid precipitate, and the precipitate was reslurried in 1.5 liters distilled water and refiltered. The precipitate was washed with 1 liter of distilled water, dried in an air oven at 120° F (49° C), and calcined in air in a muffle furnace for 3 hours at 1000° F (538° C).

Catalysts 6 and 7 were prepared as above except an aqueous 12 weight percent of sodium hydroxide was used as the precipitant. The remaining steps were the same as before.

Catalysts 8–10 were prepared by dissolving appropriate quantities of the desired metal nitrates, totalling 1.6 moles salt per batch, in distilled water to give about 1200 ml solution per batch. Each solution and an aqueous 24 weight percent potassium hydroxide solution was simultaneously and slowly added to about 2 liters of distilled water, while stirring, and maintaining a pH of about 10 until precipitation was completed. Each precipitate was recovered by filtration, washed once with one liter of distilled water, dried, and calcined as before.

Each calcined product, after cooling, was crushed and sieved to obtain 8–16 mesh particles for subsequent testing. The calculated atom ratios of the metal components in each catalyst are as follows:

| Catalyst No. | |
|---|---|
| 1: | $Cu_{0.5}Mn_1Zn_{1.5}$ |
| 2: | $Cu_1Mn_1Zn_1$ |
| 3: | $Cu_{1.5}Mn_1Zn_{0.5}$ |
| 4: | $Cu_{1.75}Mn_1Zn_{0.25}$ |
| 5: | $Cu_2Mn_1Zn_{0.25}$ |
| 6: | $Cu_{1.5}Mn_1Zn_{0.5}Bi_{0.05}$ |
| 7: | $Cu_{1.5}Mn_1Zn_{0.5}Tl_{0.04}$ |
| 8: | $Cu_{0.75}Mn_1Zn_{0.25}$ |
| 9: | $Cu_{0.75}Mn_1Ca_{0.25}$ |
| 10: | $Cu_{0.75}Mn_1Ba_{0.25}$ |
| 11: | $Cu_{0.5}Mn_1$ (Copper manganite control) |

Each catalyst (25 ml) was charged into a fixed, vertically positioned tubular reactor. A mixture of air and waste water was continuously passed in a downward fashion through the reactor, an automated test unit.

After a period of time on stream, the reactor effluent was sampled and analyzed for residual organic content in terms of ppm carbon.

The waste water feed was a synthetic mixture consisting of distilled water and sufficient methyl ethyl ketone to furnish the equivalent of 2000 ppm carbon. The feed water rate averaged 4 LHSV, the operating pressure was 1000 psig (6895 kPa), the temperature of the middle of the catalyst bed was maintained at 420° F (216° C), and the flow rate of air over the catalyst averaged 520 GHSV. The mole ratio of feed water to air averaged 9.6:1. The results obtained are presented in Table I.

Table I

| | | Liquid Phase Catalytic Air Oxidation of Aqueous Wastes over Cu-Mn-Containing Solid Catalysts | | | |
|---|---|---|---|---|---|
| Run No. | Catalyst No. | Catalyst Description | Hours on Stream | Organic Carbon in Effluent, ppm | % Carbon Removal |
| 1a | 1 | $Cu_{0.5}Mn_1Zn_{1.5}$ | 67 | 33 | 98.4 |
| 1b | | | 136 | 207 | 89.7 |
| 2a | 2 | $Cu_1Mn_1Zn_1$ | 68 | 11 | 99.5 |
| 2b | | | 136 | 27 | 98.7 |
| 3a | 3 | $Cu_{1.5}Mn_1Zn_{0.5}$ | 68 | 6 | 99.7 |
| 3b | | | 136 | 22 | 98.9 |
| 4a | 4 | $Cu_{1.75}Mn_1Zn_{0.25}$ | 67 | 15 | 99.3 |
| 4b | | | 136 | 27 | 98.7 |
| 5a | 5 | $Cu_2Mn_1Zn_{0.25}$ | 67 | 23 | 98.9 |
| 5b | | | 136 | 106 | 94.7 |
| 6a | 6 | $Cu_{1.5}Mn_1Zn_{0.5}Bi_{0.05}$ | 69 | 6 | 99.7 |
| 6b | | | 160 | 1 | 99.9 |
| 7a | 7 | $Cu_{1.5}Mn_1Zn_{0.5}Tl_{0.04}$ | 69 | 15 | 99.3 |
| 7b | | | 162 | 16 | 99.2 |
| 8a | 8 | $Cu_{0.75}Mn_1Zn_{0.25}$ | 68 | 14 | 99.3 |
| 8b | | | 136 | 17 | 99.2 |
| 9a | 9 | $Cu_{0.75}Mn_1Ca_{0.25}$ | 68 | 53 | 97.4 |
| 9b | | | 136 | 32 | 98.4 |
| 10a | 10 | $Cu_{0.75}Mn_1Ba_{0.25}$ | 68 | 16 | 99.2 |
| 10b | | | 136 | 22 | 98.9 |
| 11a | 11 | $Cu_{0.5}Mn_1$ (Control) | 68 | 176 | 91.2 |
| 11b | | | 137 | 297 | 85.2 |

The data show the invention catalysts in Runs 1–10 to be superior in performance and stability to the control catalyst in every instance under the test conditions employed. The catalysts used in Runs 1 and 5 appear to be losing their effectiveness with increasing time on stream as the carbon content in the effluent water is increasing. The results suggest that catalysts of those compositions may require early and, perhaps, frequent regeneration to restore their best activity for water purification in this process. Runs 9 and 10 indicate that the catalyst is stabilized by the addition of a minor amount of a second promoter, thus allowing the catalyst to give consistent results over a period of time.

We claim:

1. A process for the purification of aqueous streams containing organic material impurities dissolved and/or suspended therein to aqueous products substantially free of organic material which comprises contacting an aqueous stream containing oxidizable organic pollutant impurities and an oxygen-containing gas with a solid copper manganite spinel structure catalyst promoted with at least one Group II metal in which the atomic ratio of copper to manganese varies from about 0.25:1 to about 4:1 and Group II promoter metal to manganese varies from about 0.02:1 to about 4:1 under oxidation conditions including a temperature and a ratio of water to oxygen sufficient to convert said organic materials to innocuous materials such that said aqueous stream which has been substantially freed of said contaminating impurities can be safely discarded or reused.

2. A process according to claim 1 wherein said contacting is effected under liquid phase conditions at a temperature in the range of about 300° F to about 575° F, a liquid hourly space velocity (LHSV) of 0.1 to 10, and a molar ratio of water to oxygen in the range of 5:1 to 200:1.

3. A process according to claim 1 wherein said contacting is effected under vapor phase conditions at a temperature in the range of about 300° F to about 1200° F, a feed water rate of about 0.1 to 50 liquid hourly space velocity (LHSV), and a molar ratio of water to oxygen in the range of 10:1 to 200:1.

4. A process according to claim 1 wherein said aqueous stream contains hydrocarbons and oxygen-containing hydrocarbon compounds and is obtained from the effluent from an oxidative dehydrogenation process.

5. A process according to claim 1 wherein said catalyst is copper manganite promoted with calcium, strontium, barium, or zinc.

6. A process according to claim 1 wherein said oxygen-containing gas is air.

7. A process according to claim 1 wherein said catalyst is copper manganite promoted with calcium, strontium, barium, or zinc and, optionally, additionally with at least one of bismuth and thallium and said contacting is effected under liquid phase conditions at a temperature in the range of about 400°–525° F (204°–274° C) and wherein the liquid hourly space velocity is in the range of 2 to 5.

8. A process according to claim 1 in which the catalyst is additionally promoted with at least one of bismuth and thallium.

9. A catalyst composition consisting essentially of copper manganite promoted with at least one metal selected from Group IIA and Group IIB metals in which the atomic ratio of copper to manganese varies from about 0.25:1 to about 4:1 and the promoter metal to manganese varies from about 0.02:1 to about 4:1.

10. A catalyst according to claim 9 in which the promoter metal is calcium, strontium, barium, or zinc.

11. A catalyst according to claim 9 which contains at least one of bismuth and thallium as an additional promoter metal.

12. A catalyst according to claim 9 in which the promoter metal is zinc and the catalyst additionally contains bismuth or thallium as a second promoter metal.

* * * * *